United States Patent Office 3,681,102
Patented Aug. 1, 1972

---

3,681,102
TRANSPARENT GLASS-CERAMIC ARTICLES COMPRISING ZINC SPINEL
George H. Beall, Corning, N.Y., assignor to Corning Glass Works, Corning, N.Y.
No Drawing. Continuation-in-part of application Ser. No. 648,944, June 26, 1967. This application Mar. 27, 1970, Ser. No. 23,478
Int. Cl. C04b *33/00*
U.S. Cl. 106—39 DV      2 Claims

ABSTRACT OF THE DISCLOSURE

This invention relates to the production of transparent glass-ceramic articles through the controlled heat treatment of glasses in the $ZnO\text{-}Al_2O_3\text{-}SiO_2$ composition field. More particularly, this invention relates to the production of transparent glass-ceramic articles wherein zinc spinel, $ZnAl_2O_4$, (gahnite) constitutes the predominant crystal phase. These glass-ceramics can be doped with $Cr_2O_3$ to produce red transparent materials which exhibit photoluminescence similar to that displayed in $Cr_2O_3$-doped corundum crystals.

---

This application is a continuation-in-part of my pending application, Ser. No. 648,944, filed June 26, 1967, and now abandoned.

Glass-ceramic articles are the result of heat treating certain glass compositions in a controlled manner to cause these glasses to crystallize in situ. In general, the production of such articles contemplates three principal steps: (1) melting a glass-forming batch to which a nucleating agent is normally added; (2) cooling the melt and shaping a glass body therefrom; and (3) heat treating the glass body to first cause the development of nuclei therein and then cause the growth of crystals on these nuclei. The crystals are relatively uniformly fine-grained and randomly, but homogeneously, dispersed in a glassy matrix, this matrix consisting of the uncrystallized glass. For a more complete explanation of the properties and production of glass-ceramic articles, reference is made to U.S. Pat. No. 2,920,971.

I have discovered that certain glasses in the $ZnO\text{-}Al_2O_3\text{-}SiO_2$ composition field can be nucleated with $ZrO_2$ to yield extremely fine-grained glass-ceramic bodies containing zinc spinel as the principal crystal phase which remain transparent for short periods of time at 1200° C. and at extended service temperatures of 1000° C. This capability of retaining transparency at high temperatures suggests the use of such products in high temperature lamp applications. Further, the photoluminescence exhibited by these glass-ceramic articles when doped with $Cr_2O_3$ has promoted the consideration of them as laser materials.

In its most general terms, my invention comprises heat treating a glass article consisting essentially, by weight on the oxide basis, of about 55–75% $SiO_2$, 8–25% $Al_2O_3$, 2–20% ZnO, and 2–12% $ZrO_2$ as the nucleating agent. This heat treatment yields a uniformly very fine-grained glass-ceramic article containing spinel $ZnAl_2O_4$ as the primary crystal phase. The crystals are very small, substantially all finer than 1000 A. in diameter, and constitute at least 20% and, generally, less than 50% by weight of the article, the remainder being highly siliceous glass. The coefficients of thermal expansion (25–300° C.) of these glass-ceramics range about $25\text{--}40\times10^{-7}/°$ C.

In forming articles of this invention, batches for the examples recorded in Table I were compounded and then ballmilled together to aid melting and improve glass homogeneity. The batch ingredients may be any materials, either oxides or other compounds, which, on being melted together, are converted to the desired oxide compositions in the proper proportions. Hence, Table I reports several glass compositions suitable for my invention expressed in weight percent on the oxide basis. The batch materials were placed in open platinum crucibles and melted at 1650°–1800° C. for about 5–16 hours, these batches containing large quantities of $Al_2O_3$ and/or $ZrO_3$ requiring higher melting temperatures. Pieces of glass cane about ¼″ in diameter were drawn from the melts by hand for use in physical property determinations and the remainder of each melt poured into a steel mold to give a flat plate about ¼″ thick. The flat plates were immediately transferred to an annealer operating at about 800° C. and cooled as glass to room temperature. These glass plates were first inspected for glass quality and then placed in an electrically-heated furnace. The temperature was raised within the furnace at about 5° C./minute to between about 975°–1250° C. and held within that range of temperatures for a period of time sufficient to obtain the desired very fine-grained spinel crystallization. Finally, the crystallized plates were cooled to room temperature.

The rate at which the glass shapes are heated from room temperature to the crystallization range is dependent upon the dimensions of the article and the coefficients of thermal expansion of the glass. Since the coefficients of thermal expansion of the glasses suitable for this invention are relatively low, viz, about $15\text{--}40\times10^{-7}/°$ C. (25°–300° C.) very rapid heating rates can be successfully employed without cracking or breaking of the shapes occurring.

In the crystallization process, it is commonly believed that nuclei are first developed as the article is heated within the transformation range of the glass. The transformation range is the temperature at which a liquid melt is considered to have become a vitreous solid, this temperature being in the vicinity of the annealing point of the glass. These nuclei provide sites for the subsequent growth of crystals. However, crystallization of the glass proceeds more rapidly as the temperature thereof is raised to the liquidus of the crystal phase and, therefore, the temperature of the glass article is usually raised above that employed for nucleation, i.e., above the softening point of the glass, in order to expedite crystallization in situ. Nevertheless, it can be readily appreciated that at the early stages of crystallization the ratio of crystals to glassy matrix is small and the article will not maintain its shape if temperature is raised too rapidly above the transformation range. Thus, the rate at which the article is heated must be balanced against the rate at which crystallization proceeds or deformation, resulting from a lowering of viscosity, will render the final product generally of little use. Therefore, I prefer to increase the temperature above the transformation range at not more than about 5° C./minute to insure fine-grained crystallization with little or no deformation as the articles are heated above the softening point of the glass. However, more rapid heating rates have been employed successfully where deformation of the article is not critical or where some physical support has been provided for the articles.

When economies in heating are desired, the crystallization heat treatment may be carried out immediately after the glass article has been shaped and is still hot, rather than cooling to room temperature for visual inspection and then reheating. Hence, the glass shape may merely be cooled to just below the transformation range and subsequently reheated to nucleate and crystallize it.

The crystallization of the glasses of this invention is, quite apparently, a time-temperature dependent process. Thus, where the glass shape is heated to a temperature somewhat higher than the transformation range thereof and maintained thereat until crystallization is essentially complete, the dwell period will necessarily be very long, perhaps 24 and, possibly, even 48 hours. However, where temperatures within the upper end of the crystallization range are employed, dwell times as short as about ½–4 hours may be sufficient. Of course, much longer crystallization times may be utilized but the character of the crystals and the properties of the final product are essentially unchanged so there is no practical reason for doing so.

My preferred practice comprises a two-step heat treating schedule wherein the glass article is first heated to a temperature between about 850°–950° C. and held thereat for about 1–8 hours to insure substantial nucleation. Thereafter, the article is heated to between about 1000°–1250° C. and maintained thereat for about 2–8 hours to complete the fine-grained crystallization of zinc spinel. This procedure normally results in an article exhibiting very little, if any, deformation.

Finally, it will be appreciated that a holding period at any particular heat treating temperature is not required. Thus, the crystallization may be accomplished by gradually increasing the temperature above the transformation range, this increase preferably being balanced by the rate of crystals being grown such that deformation of the article is inhibited. Further, of course, changes in temperatures within the heat treating range, whether higher or lower, are contemplated within the method of the invention.

After crystallization in situ has been essentially completed, the glass-ceramic article is cooled to room temperature. Since the coefficients of thermal expansion of these glass-ceramics are relatively low ($25$–$40 \times 10^{-7}/°$ C.), articles of rather small dimensions can simply be removed from the heat treatment chamber and allowed to cool to room temperature in the ambient environment. However, articles of large thicknesses diameters may require a slower cooling schedule to preclude any hazard of thermal breakage. Such practice is believed to be well within the manipulative techniques of one of ordinary skill in the art.

The above-recited ranges of ZnO, $Al_2O_3$, $SiO_2$, and $ZrO_2$ have been found necessary to produce the desired fine-grained, transparent glass-ceramic articles. MgO in amounts up to about 5% can be included and enters into the crystal structure along with ZnO to yield the zinc spinel solid solution $(Zn, Mg) Al_2O_4$. Larger amounts of MgO tend to cause the precipitation of undesirable silicate phases such as quartz solid solutions which impair transparency. Small amounts of other compatible metal oxides such as BaO, CaO, SrO, $K_2O$, $Rb_2O$, and $Cs_2O$ may be present but the total of all such additions is preferably less than about 10% by weight. Other oxides such as $Li_2O$, $Na_2O$, $B_2O_3$, and $TiO_2$ may also be present but the total of such additions is preferably less than 5% by weight. Where a $Cr_2O_3$-doped article is desired, an amount between 0.01–1.0% is required.

Although the glass compositions recorded in Table I did not contain a fining agent, it will be understood that in large scale production a conventional fining agent such as $As_2O_3$ may be included in the batch materials. Generally, about 0.5–1% by weight is added but, since the amount remaining in the glass after the batch has been melted is too small to materially affect the character and properties of the glass, its omission from these melts was not considered improper.

TABLE I

| Percent: | 1 | 2 | 3 | 4 | 5 | 6 | 7 |
|---|---|---|---|---|---|---|---|
| $SiO_2$ | 64.8 | 64.8 | 66.0 | 65.2 | 65.1 | 66.0 | 67.8 |
| $Al_2O_3$ | 18.5 | 15.7 | 16.0 | 17.2 | 17.2 | 16.0 | 17.0 |
| ZnO | 4.6 | 12.0 | 12.3 | 6.1 | 6.0 | 12.2 | 5.7 |
| MgO | 4.6 | | | 4.7 | 4.7 | | 3.8 |
| $ZrO_2$ | 7.5 | 7.5 | 5.7 | 6.5 | 6.5 | 5.6 | 5.6 |
| $Cr_2O_3$ | | | | 0.3 | 0.5 | 0.2 | 0.1 |
| Melting temp., °C | 1,650 | 1,800 | 1,650 | 1,650 | 1,650 | 1,650 | 1,650 |

Table II reports that treating schedules employed to obtain fine-grained spinel crystallization (a 5° C./minute temperature increase being employed), the appearance of the crystallized products, the crystal phases present as determined by X-ray diffraction analysis, and measurements of coefficients of thermal expansion ($\times 10^{-7}/°$ C. between 25°–300° C.) determined in the conventional manner.

TABLE II

| Example No. | Heat treating schedule | Appearance | Crystal phases | Expansion coefficient |
|---|---|---|---|---|
| 1 | 905° C. for 4 hrs., 1,065° C. for 6 hrs. | Transparent, colorless. | Zinc spinel, cubic $ZrO_2$ | 34 |
| 1 | 900° C. for 6 hrs., 1,100° C. for 6 hrs. | Transparent, slight haze, colorless. | do | |
| 2 | 1,000° C. for 8 hrs | Transparent, colorless | do | 30 |
| 3 | 900° C. for 2 hrs., 1,100° C. for 8 hrs. | do | do | 32 |
| 3 | 900° C. for 2 hrs., 1,200° C. for 8 hrs. | Transparent, some haze, colorless. | do | 32 |
| 4 | 810° C. for 4 hrs., 910° C. for 3 hrs., 1,010° C. for 6 hrs. | Transparent, red | do | |
| 5 | do | do | do | |
| 6 | 900° C. for 6 hrs., 1,000° C. for 6 hrs. | do | do | |
| 7 | do | do | do | |

Table II clearly demonstrates the capability of this invention to produce a transparent glass-ceramic article wherein zinc spinel is the predominant crystal phase. X-ray diffraction has determined the crystals to have the structure of zinc spinel although, where solid solution results from, say, the inclusion of MgO in the crystal structure of zinc spinel although, where solid solution characteristic of the zinc spinel crystals are observed, but their spacings and intensities vary somewhat reflecting a distortion of the crystal cell structure but not the destruction thereof. Cubic $ZrO_2$ has been detected in these articles but in very small amounts only. The transparency of these articles is the result of the crystals being exceedingly small in size, commonly all being significantly smaller than 1000 A. in diameter. Modulus of rupture measurements conducted on these glass-ceramics indicate strengths between 10,000–15,000 p.s.i.

The $Cr_2O_3$-doped articles (Examples 4–7) exhibit excellent optical properties, low coefficients of thermal expansions ($25$–$40 \times 10^{-7}/°$ C. as compared with $70$–$80 \times 10^{-7}/°$ C. for $Al_2O_3$), and a dark red fluorescence when exposed to visible light. These factors, coupled with the ease of their production and forming, offer considerable advantages over commercially-available single crystal rubies.

I claim:

1. A transparent glass-ceramic article wherein the crystal content thereof is substantially free from silicate-containing phases and is at least 20% but less than 50% by weight, said crystals consisting essentially of zinc spinel and being substantially all finer than 1000 A. in diameter, the composition of said article being substantially the same throughout and consisting essentially, by weight on the oxide basis, of about 55–75% $SiO_2$, 8–25% $Al_2O_3$, 2–20% ZnO, and 2–12% $ZrO_2$.

2. A transparent glass-ceramic article exhibiting a red-hue photoluminescence wherein the crystal content thereof is at least 20% but less than 50% by weight, said crystals consisting essentially of $Cr_2O_3$-doped zinc spinel and being substantially all finer than 1000 A. in diameter, the composition of said article being substantially the same throughout and consisting essentially, by weight on the oxide basis, of about 55–75% $SiO_2$, 8–25% $Al_2O_3$, 2–20% ZnO, 0.01–1.0% $Cr_2O_3$, and 2–12% $ZrO_2$.

References Cited

UNITED STATES PATENTS

| | | | |
|---|---|---|---|
| 3,252,811 | 5/1966 | Beall | 106—39 DV |
| 3,380,818 | 4/1968 | Smith | 106—39 DV |
| 2,920,971 | 1/1960 | Stookey | 106—39 DV |
| 3,300,670 | 1/1967 | Veres | 106—39 DV |
| 3,241,985 | 3/1966 | Kuwayama | 106—39 DV |
| 3,370,963 | 2/1968 | Bonner et al. | 106—42 |
| 3,365,316 | 1/1968 | Kingery et al. | 106—42 |

FOREIGN PATENTS

| | | | |
|---|---|---|---|
| 1,099,135 | 2/1961 | Germany | 106—39 |

OTHER REFERENCES

Hurlbut, C. S.: Dana's Manual of Mineralogy; New York, N.Y., 1941, p. 195.

TOBIAS E. LEVOW, Primary Examiner

W. R. SATTERFIELD, Assistant Examiner

U.S. Cl. X.R.

106—52; 252—301.6 F